United States Patent [19]
Lansberry et al.

[11] Patent Number: 5,804,724
[45] Date of Patent: Sep. 8, 1998

[54] ROTOR SPEED ESTIMATOR

[75] Inventors: Geoffrey B. Lansberry, Cambridge; William F. Bonnice, Dorchester, both of Mass.

[73] Assignee: Chrysler Corporation, Auburn Hills, Mich.

[21] Appl. No.: 916,180

[22] Filed: Aug. 21, 1997

Related U.S. Application Data

[63] Continuation of Ser. No. 642,163, May 2, 1996, abandoned.

[51] Int. Cl.$^6$ .................................................. G01P 11/00
[52] U.S. Cl. .............................. 73/488; 73/137; 73/116; 324/160; 361/236; 361/239; 364/565; 364/571.04; 364/571.05; 364/570
[58] Field of Search ............................ 73/488, 489, 494, 73/1.37, 1.42, 116; 324/160; 361/236, 239; 364/565, 569, 570, 571.02, 571.04, 571.05

[56] References Cited

U.S. PATENT DOCUMENTS

| | | | |
|---|---|---|---|
| 4,055,993 | 11/1977 | Rackliffe et al. | 73/116 |
| 4,274,142 | 6/1981 | Furuhashi et al. | 364/465 |
| 4,444,285 | 4/1984 | Stewart et al. | 180/65.4 |
| 4,495,451 | 1/1985 | Barnard | 318/150 |
| 4,533,011 | 8/1985 | Heidemeyer et al. | 180/65.2 |
| 4,631,456 | 12/1986 | Drescher et al. | 318/140 |
| 4,900,962 | 2/1990 | Hockney et al. | 310/90.5 |
| 4,961,352 | 10/1990 | Downer et al. | 74/5.46 |
| 5,172,784 | 12/1992 | Verela, Jr. | 180/65.4 |
| 5,255,733 | 10/1993 | King | 165/39 |
| 5,291,975 | 3/1994 | Johnson et al. | 188/378 |
| 5,318,142 | 6/1994 | Bates et al. | 180/65.2 |
| 5,319,273 | 6/1994 | Hockney et al. | 310/90.5 |
| 5,327,987 | 7/1994 | Abdelmalek | 180/65.2 |
| 5,345,761 | 9/1994 | King et al. | 60/274 |
| 5,353,656 | 10/1994 | Hawkey et al. | 74/5.41 |
| 5,396,140 | 3/1995 | Goldie et al. | 310/268 |
| 5,415,245 | 5/1995 | Hammond | 180/165 |
| 5,442,288 | 8/1995 | Fenn et al. | 324/244 |
| 5,465,015 | 11/1995 | Anastas et al. | 310/26 |
| 5,479,811 | 1/1996 | Baumann et al. | 73/1.37 |
| 5,539,308 | 7/1996 | Teramae et al. | 324/173 |

OTHER PUBLICATIONS

Popular Science Magazine, Emerging Technologies for the Supercar, Jun. 1994.
NASA Tech Briefs, The Digest of New Technology, Jun. 1995, vol. 19, No. 6, pp. 12 and 13.

Primary Examiner—Hezron E. Williams
Assistant Examiner—Richard A. Moller
Attorney, Agent, or Firm—Mark P. Calcaterra

[57] ABSTRACT

A method for accurately estimating the rotational speed of a machine includes the steps of initializing a counter, measuring a position of the machine, incrementing the counter, waiting for a position update, measuring a next position of the machine, calculating a difference between the position measurement, measuring the amount of time elapse between positions, returning to the step of incrementing to the counter if the difference is less than a predetermined amount, returning to the step of incrementing the counter if the amount of time is less than a predetermined time, dividing the difference by the amount of time to determine the estimated rotational speed of the machine, and outputting the estimated rotational speed of the machine.

3 Claims, 9 Drawing Sheets

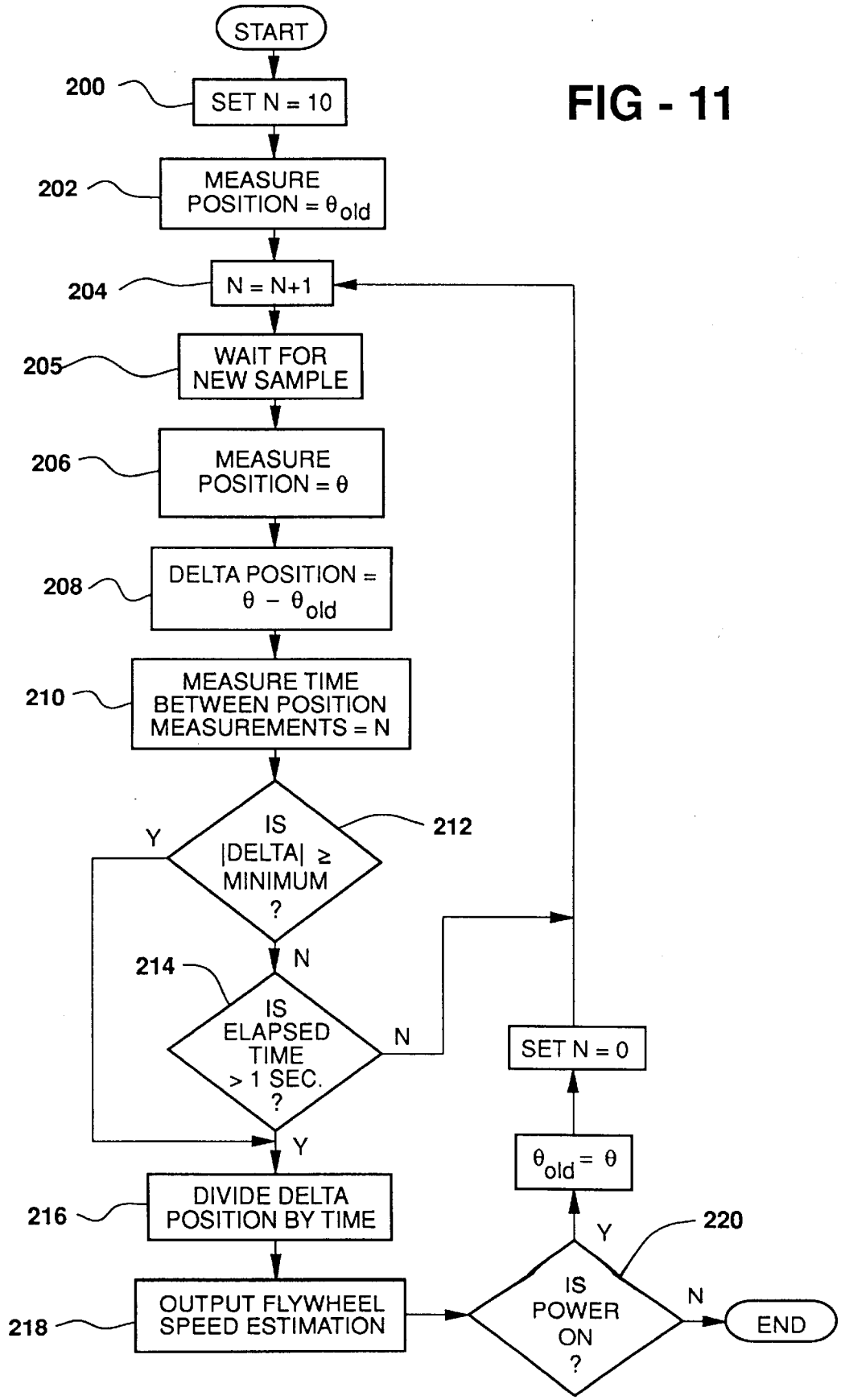

ROTOR SPEED ESTIMATOR

CROSS-REFERENCE TO RELATED APPLICATION

This application is a continuation of application Ser. No. 08/642,163, titled "Rotor Speed Estimator" filed May 2, 1996 by the same inventors as in the present application now abandoned.

BACKGROUND OF THE INVENTION

1. Field of the Invention

The present invention relates generally to powertrain systems in vehicles, and, more particularly, to a hybrid powertrain system in an automotive vehicle.

2. Description of the Related Art

Since the invention of power vehicles, many different powertrain systems have been attempted, including a steam engine with a boiler or an electric motor with a storage battery. It was, however, the four-stroke internal combustion engine invented by Otto in 1876, and the discovery of petroleum in 1856 that provided the impetus for the modern automotive industry.

Although gasoline emerged as the fuel of choice for automotive vehicles, recent concerns regarding fuel availability and increasingly stringent federal and state emission regulations have renewed interest in alternative fuel powered vehicles. For example, alternative fuel vehicles may be powered by methanol, ethanol, natural gas, electricity or a combination of fuels.

A dedicated electric powered vehicle offers several advantages: electricity is readily available; an electric power distribution system is already in place; and an electric powered vehicle produces virtually zero emissions. There are several technological disadvantages that must be overcome before electric powered vehicles gain acceptance in the marketplace. For instance, the range of an electric powered vehicle is limited to approximately 100 miles, compared to about 300 miles for a gasoline powered vehicle. Further, the acceleration is about half that of a similar gasoline power vehicle. There is, therefore, a need in the art for a powertrain to provide an electric machine for an automotive vehicle which capable of performing as dynamically as an internal combustion engine.

SUMMARY OF THE INVENTION

It is an object of the present invention to estimate the rotational speed of the flywheel.

If is another object of the present invention to accurately estimate the rotational speed of the flywheel.

According to the foregoing objects, a method for accurately estimating rotational speed of a rotor in a flywheel is disclosed. The method includes the step of initializing a counter. A measurement is taken as to the position of the rotor. The counter is then incremented. The next position of the rotor is measured. A difference between the position measurements is taken. The amount of time elapse between the measurements of the positions is measured. The method includes the step of returning to the step of adding to the counter if the difference if greater than a predetermined amount. The method also includes the step of returning to the step of adding to the counter if the amount of time exceed a predetermined time. If these two values have not been exceeded, the difference is divided the amount of time to determine the estimated rotational speed of the rotor. The estimated rotational speed of the rotor is then output.

One advantage of the present invention is the ability to estimate the speed of the flywheel. Another advantage of the present invention is the ability to accurately estimate the rotational speed of the flywheel to within 1% accuracy.

Other objects, features and advantages of the present invention will be readily appreciated as the same becomes better understood after reading the subsequent description taken in conjunction with the accompanying drawings.

BRIEF DESCRIPTION OF THE DRAWINGS

FIG. 11 is a flow chart for a method to accurately estimate the rotational speed of the rotor of the flywheel.

DESCRIPTION OF THE PREFERRED EMBODIMENT(S)

Figure 1:
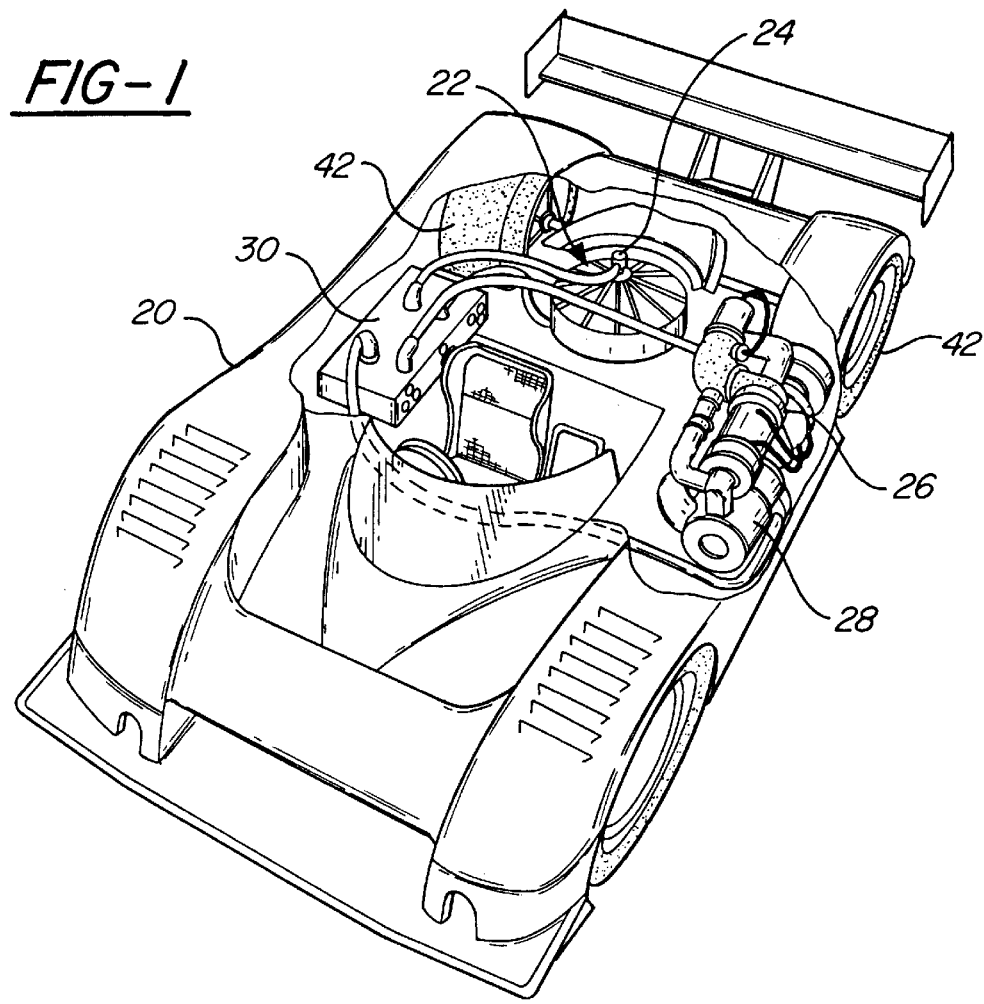
FIG. 1 is a perspective view partially cut away of an automotive vehicle.
Figure 2:
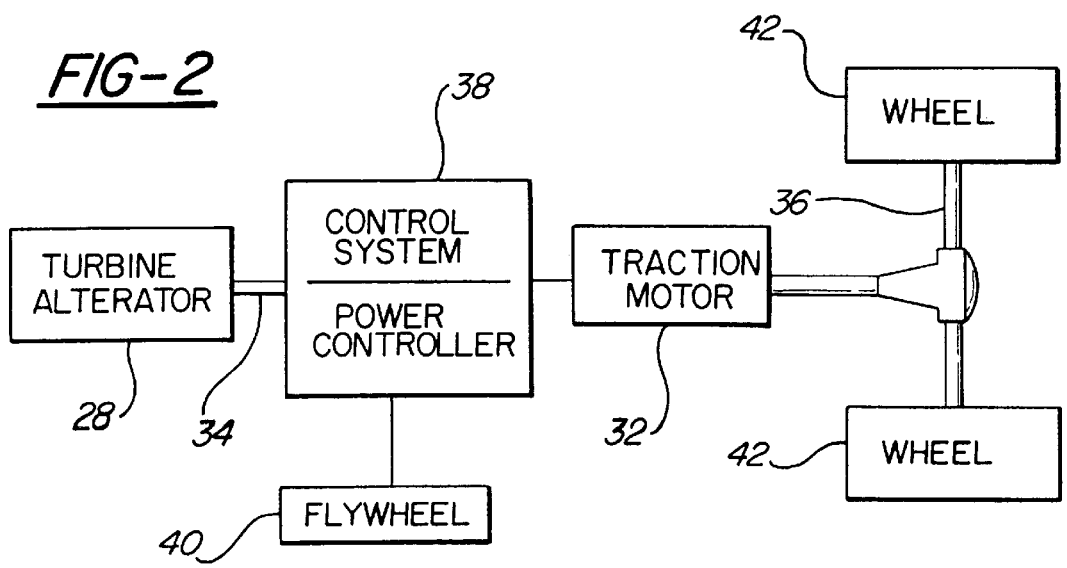
FIG. 2 is a block diagram of the power train for the automotive vehicle.

Referring to FIGS. 1 and 2, a hybrid powertrain system is illustrated for an automotive vehicle 20. The vehicle 20 is partially shown in a cut away view illustrating a hybrid powertrain system 22 disposed within the chassis 24. The hybrid powertrain system 22 includes a gas powered turbine engine 26, which in this example is fueled by liquefied natural gas. The turbine engine 26 spins an alternator 28 to generate electric power. It should be appreciated that in this example there are two alternators 28 that run at different speeds, such as 60,000 rpm and 100,000 rpm, to produce electricity equivalent to 500 horsepower. It should also be appreciated that the turbine engine 26 and the alternator 24 may be referred to as a turboalternator.

A power controller 38 is in communication with the turbine engine 26 and alternator 28, and manages the distribution of power from the alternator 28 to a traction or induction motor 32 using a power transfer mechanism 34, utilizing a three phase variable frequency alternating current (VFAC). In this example the traction motor 32 is an AC induction traction motor 32. The traction motor 32 transfers its energy to the drive train 36 to drive the automotive vehicle 20.

Therefore, a signal from a vehicle management controller 30 to accelerate the automotive vehicle 20 is communicated to the power controller 38. The power controller 38 directs the alternator 28 and if necessary a flywheel 40, to supply power to the traction motor 32 and eventually to wheels 42. If the power need of the traction motor 30 is low, the power controller 38 directs the excess power capacity into the flywheel 36 for storage.

Preferably, the hybrid powertrain system 22 also includes various critically placed sensors which are conventional and well known in the art. The outputs of these sensors communicate with the power controller 38. It should also be appreciated that the automotive vehicle 20 includes other hardware not shown, but conventional in the art to cooperate with the hybrid powertrain system 20.

Figure 3:
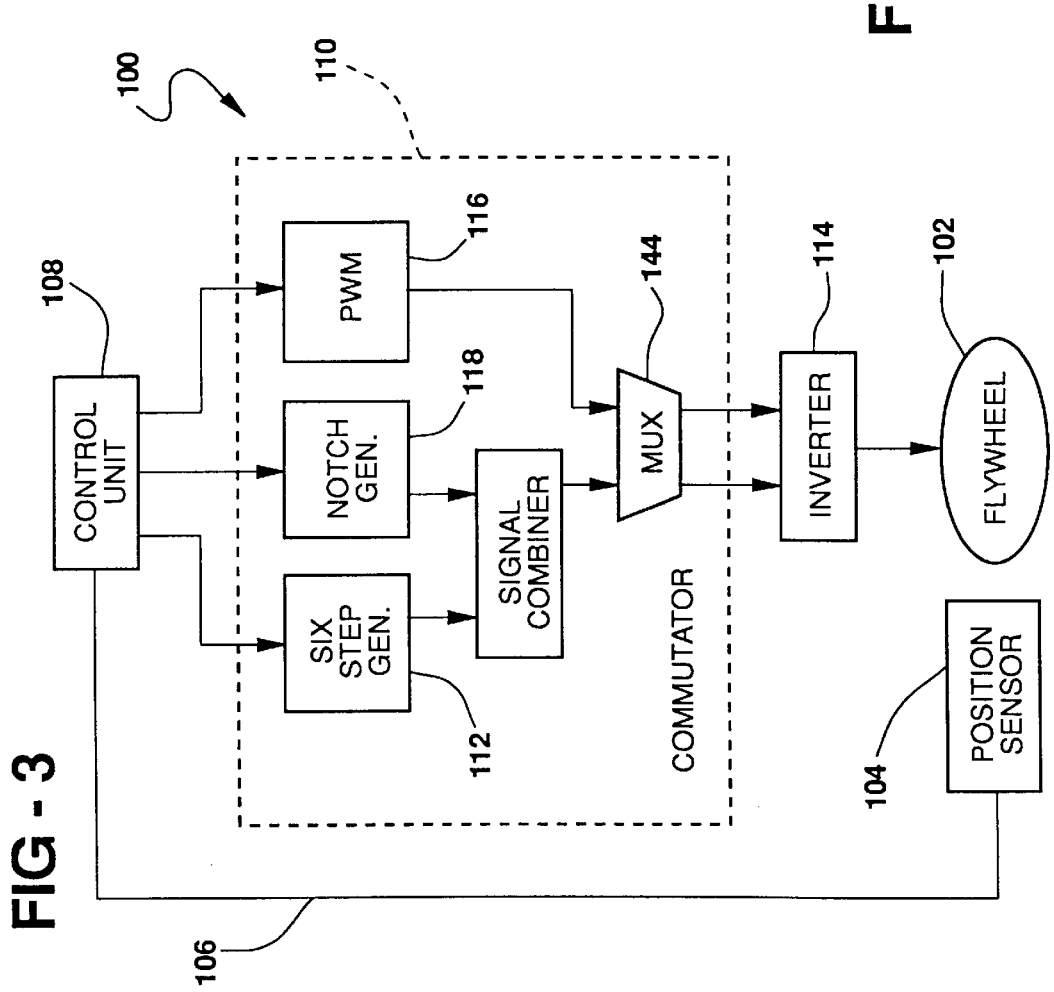
FIG. 3 is a block diagram of one embodiment of the flywheel controller.

Referring to FIG. 3, a flywheel controller is generally indicated at 100. The flywheel controller 100 controls the output of a flywheel 102. A sensing unit 104 senses the rotational position of the flywheel 102. The sensing unit 104, a position sensor, transmits a signal over line 106 to a control unit 108. Although the position sensor 104 is shown as an encoder in FIGS. 4 and 13, it should be appreciated to those skilled in the art that any type of position identification may be used. The control unit is operatively connected to the sensing unit 104. The control unit 108 creates a command signal indicative of the power desired to be absorbed by the flywheel 102 or, in the alternative, supplied by the flywheel 102 for the purpose of balancing the power flow in the system.

The control signal is sent to a commutator 110. The commutator 110 is operatively connected to the controller 108 and receives the command signal therefrom. The commutator 110 commutates electrical signals to the stator (not shown) of the flywheel 102.

The commutator 110 also includes a pulse width modulator 116. The pulse width modulator 116 controls the power output from the flywheel 102 over a first predetermined flywheel speed range. The range in which the pulse width modular operates is between 0 RPM and 15,000 RPM.

The commutator 110 also includes a six step generator 112. The six step generator 112 controls the power from the flywheel over a second predetermined flywheel speed range. More specifically, the six step generator 112 provides a voltage signal to an AC bus 114 to control the output of the flywheel 102 to regulate the output thereof. The second predetermined flywheel speed range is approximately from 29,000 RPM to 58,000 RPM.

The flywheel controller 100 incorporates the use of a notch generator 118 within the commutator 110. The notch generator 118 injects a notch into the six step pattern for the purpose of voltage control. The notch generator is used in combination with the six step generator 112 to enlarge the second predetermined flywheel speed range. More specifically, the notch generator 118 allows the step generator 112 to control power from the flywheel over into a third predetermined flywheel speed range which is an extension of the second predetermined flywheel speed range. In fact, the notch generator 118 can be thought of as being operable in the second range, albeit a larger second range, but set for a zero angle output. This third predetermined range extends between 15,000 RPM and 29,000 RPM.

Figure 7:
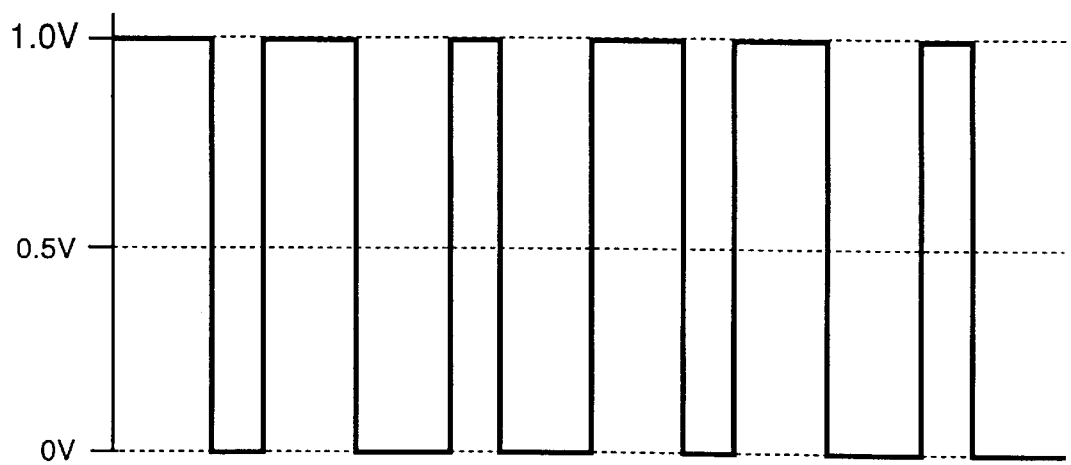
FIG. 7 is a graphic representation of the combination of the outputs of the step generator and the notch generator.

The commutator 110 includes a signal combiner 120. The signal combiner 120 combines the output of the six step generator 112 and the notch generator 118 before it is received by the voltage bus 114 to control the voltage applied to flywheel 102, the output of which is shown in FIG. 7.

Figure 4:
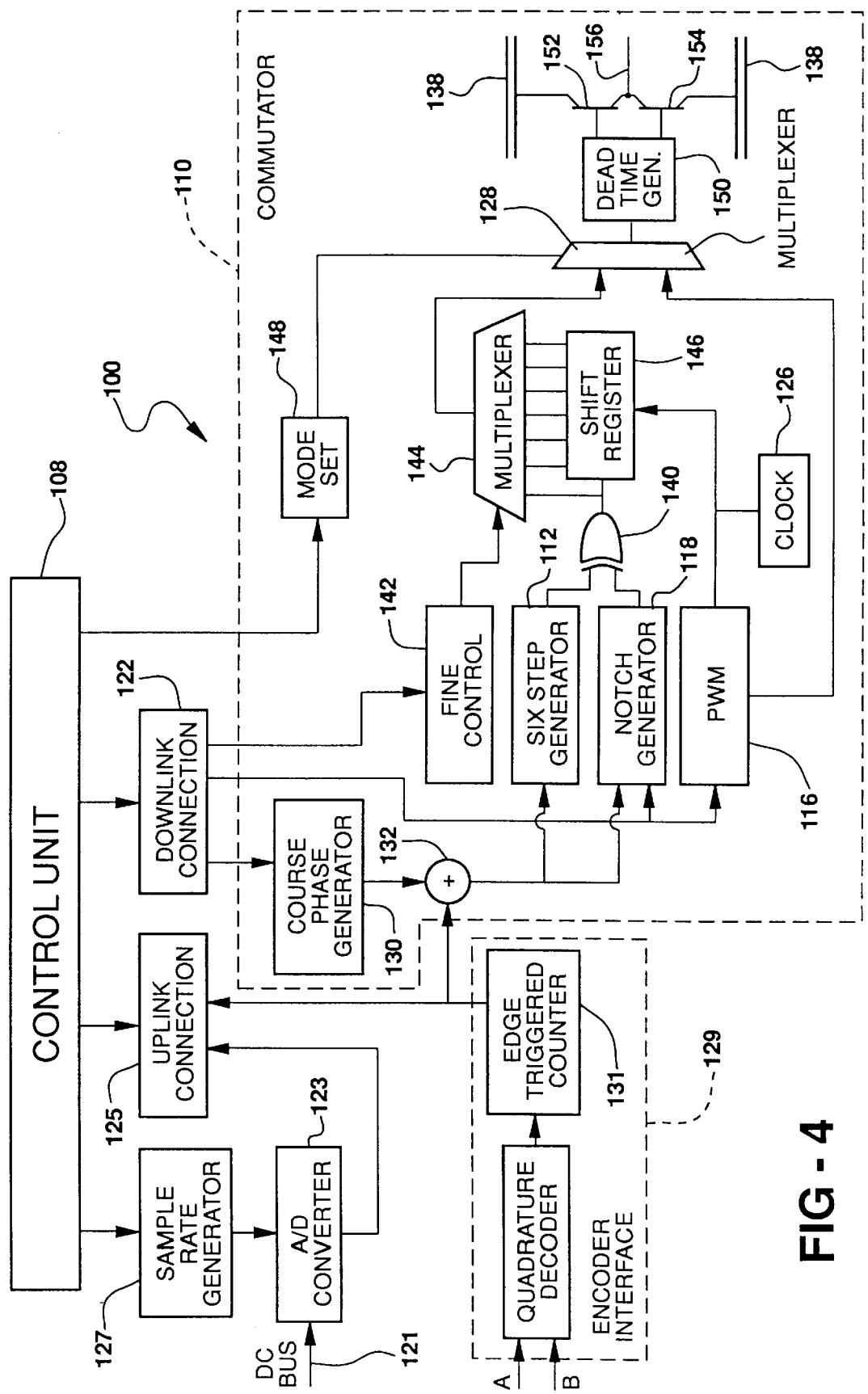
FIG. 4 is a block diagram of one embodiment of the commutator of the flywheel in relation to the controller thereof.
Figure 5:
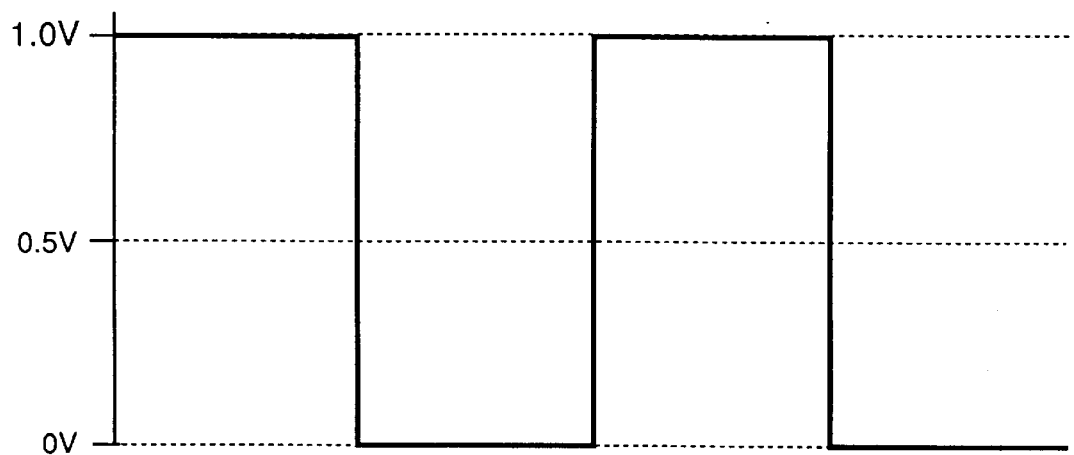
FIG. 5 is a graphic representation of the output of the step generator.
Figure 6:
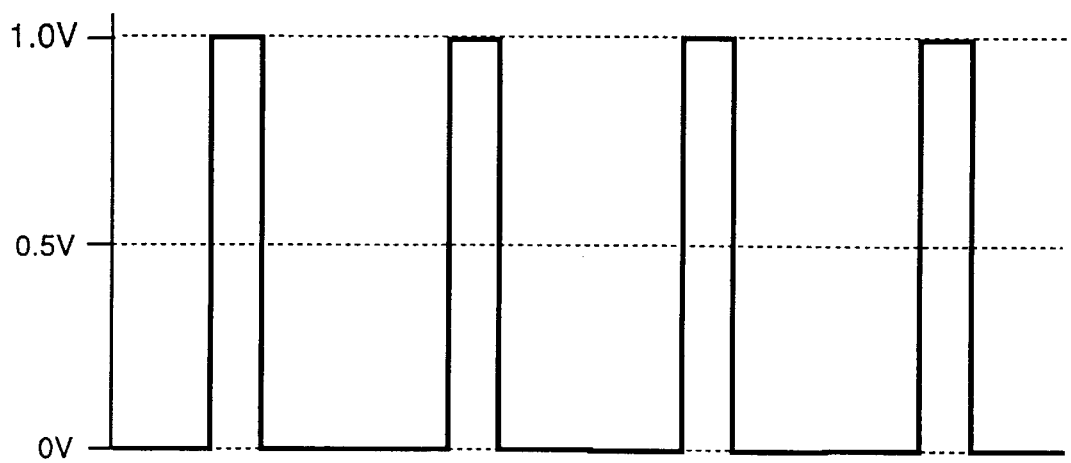
FIG. 6 is a graphic representation of the output of the notch generator.

Referring to FIG. 4, the flywheel controller 100 is shown in greater detail. The control unit 108 receives a digitized signal from the DC bus 121 as it passes through an A/D converter 123 through an uplink connection 125. The control unit 108 controls a sample rate generator 127 which directs the A/D converter 123 in its generation of data. It may be appreciated by those skilled in the art that the DC bus 121 is not connected directly to the A/D converter 123, but only after the voltage has been reduced from the 800 V through means well known in the art.

An encoder interface 129 receives two inputs A and B, representing phase and quadrature of position increments of the rotor. The encoder interface 129, a device known to those skilled in the art, converts the A and B signals into a position signal. The output of the encoder interface 129 is sent to the uplink connection 125 and into the control unit 108. The control unit 108 can also determine, based on whether successive position inputs are increasing or decreasing, the direction of the movement of the rotor in the flywheel 102.

Upon determining the proper control commands for the flywheel controller 100, the control unit 108 sends a signal down through a downlink connection 122. The downlink connection 122 sends a signal to one of several points. The first of which is a pulse width modulator 124. The pulse width modulator 124 controls the power output from the flywheel 102 over a first predetermined rotational speed range. The rotational speed range in which the pulse width modulator 124 operates is between 0 RPM and 15,000 RPM. The pulse width modulator is clocked using a clock 126. In one embodiment, the clock 126 has an output of 16 MHz. The output of the pulse width modulator 124 is received by a first multiplexer 128, discussed subsequently.

If the rotor of the flywheel 102 is rotating at a speed greater than 15,000 RPM, the control unit 108 will operate a coarse phase generator 130 whose output, when added by an adder 132 with the edge triggered counter 131, will operate a step generator 134. In one embodiment, the step generator 134 is a six step generator. The output of the adder 132 is also connected to a notch generator 136, discussed subsequently. The six step generator 134 controls the power to the rotor of the flywheel 102 over a second predetermined rotational speed range. More specifically, the six step generator 134 provides a switching signal to inverter transistors 152,154 to control the power output of the flywheel 102. The second predetermined range is at speeds greater than the first predetermined range. In one embodiment, the second predetermined range extends from 29,000 RPM to 58,000 RPM. In alternative embodiment, the second predetermined range extends from 15,000 RPM up through 58,000 RPM.

The flywheel controller 100 incorporates the use of the notch generator 118, in combination with the six step generator 112, to enlarge the second predetermined range. More specifically, the notch generator 118 allows the six step generator 134 to control power from the flywheel 102 over into a third predetermined rotational speed range which is an extension of the second predetermined speed range. In fact, the notch generator 118 can be thought of as being inoperable in the second range but set for a zero angle output. An exclusive OR gate 140 combines the outputs of the six step generator 112 and the notch generator 118. The output of the exclusive OR gate 140 can be best seen in FIG. 7.

The control unit 108 sends an output signal to the fine control 142 which operates a second multiplexer 144. The second multiplexer 144 receives outputs from the exclusive OR gate 140 through a shift register 146. Based on the output of the fine control 142, the multiplexer 144 outputs a delayed six step signal based on the position of the rotor in the flywheel 142.

The control unit 108 also controls a mode set 148 which controls the first multiplexer 128 in determining whether the output from the six step generator 112 or the output from the pulse width modulator 116 is to be used. The mode set 148 receives its instruction based on the rotational speed of the flywheel 102. The output of the first multiplexer 128 is sent to a dead time generator 150. The dead time generator 150 delays the turn on of either a first transistor 152 or a second transistor 154 for a certain programmable time. The time in which the transistor, either the first transistor 152 or the second transistor 154, is turned off is the time in which it can be determined that the other of the two transistors 152,154 has been turned off. The dead time generator 150 is used because there is no time when both of the transistors 152,154 should be turned on at the same time.

Figure 8:
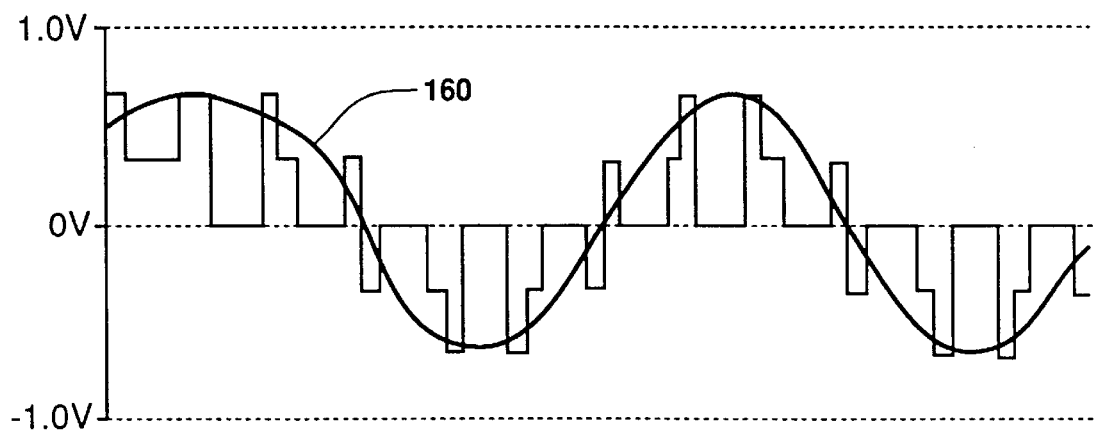
FIG. 8 is a graphic representation of the output of the voltage bus based on the input of FIG. 7.

As can be seen in FIG. 8, the output as seen by a flywheel stator 156 approximates a sine wave 160 when a notched wave form pattern is produced by the inverter transistors 152,154.

Figure 12:
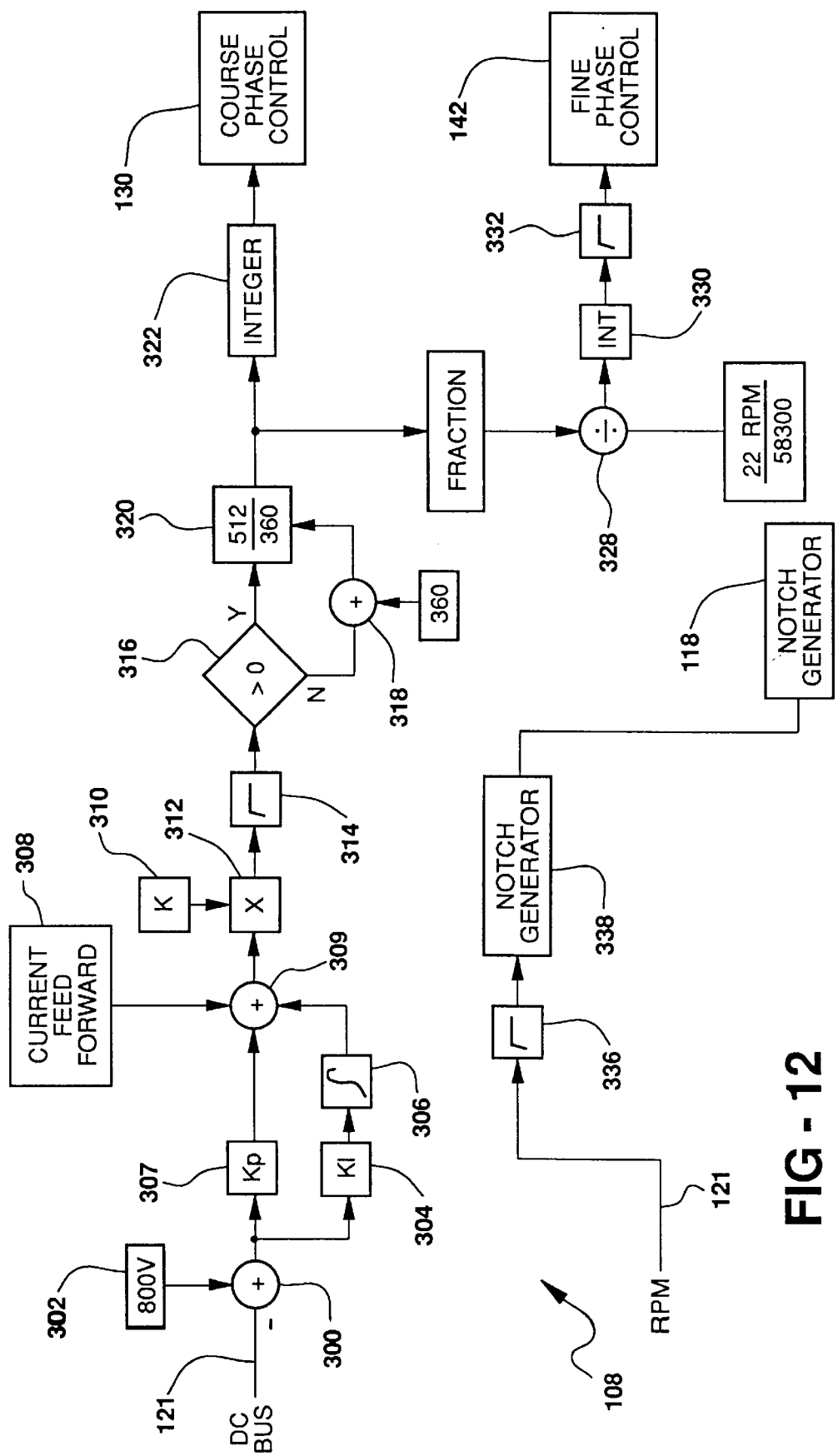
FIG. 12 is a block diagram a control unit of one embodiment of the present invention.

Referring to FIG. 12, the control unit 108 is generally shown. One of the inputs of the controller 108 received by the uplink 125 is represented by a DC bus lead line. The uplink 125 transmits data regarding the DC bus and the position in terms of encoder counts. The value of the DC bus is subtracted at second adder 300 from an 800 volt value 302. The resulting value, voltage error, is input into a proportional and integral controller (PI) wherein the second signal is multiplied at 304 and is integrated at 306. The original signal is directly multiplied at 307 and is added with the integrated value 306, and with a current feed forward value 308 which is an estimate as to what current might be needed. This value, added by an adder 309 is multiplied with a constant K 310 by a multiplier 312. The resulting signal represents a phase angle command. A limiter 314 limits the value passing therethrough to values between ±90 degrees. It is then determined whether the value, θ, is greater than zero or less than zero at 316. If less than zero, 360° is added to the value at 318. This value is then converted to encoder units at 320. If θ is greater than zero, it is immediately converted to encoder units at 320. The integer value of the digitized signal, separated from the digitized value at 322, then becomes the coarse phase control at 324. The fraction, separated from the digitized value at 326 is then divided by a value, the RPM multiplied by 22 with the product being divided by 58,300 at 328. The integer value is taken at 330 and limited at 332. This value becomes the fine phase control at 334.

With regard to the RPM, it is limited at 336. It becomes the value for the notch generator at 338. The limit is the value of speed at which the notch completely closes up or, alternatively, reduces to zero.

Figure 9:
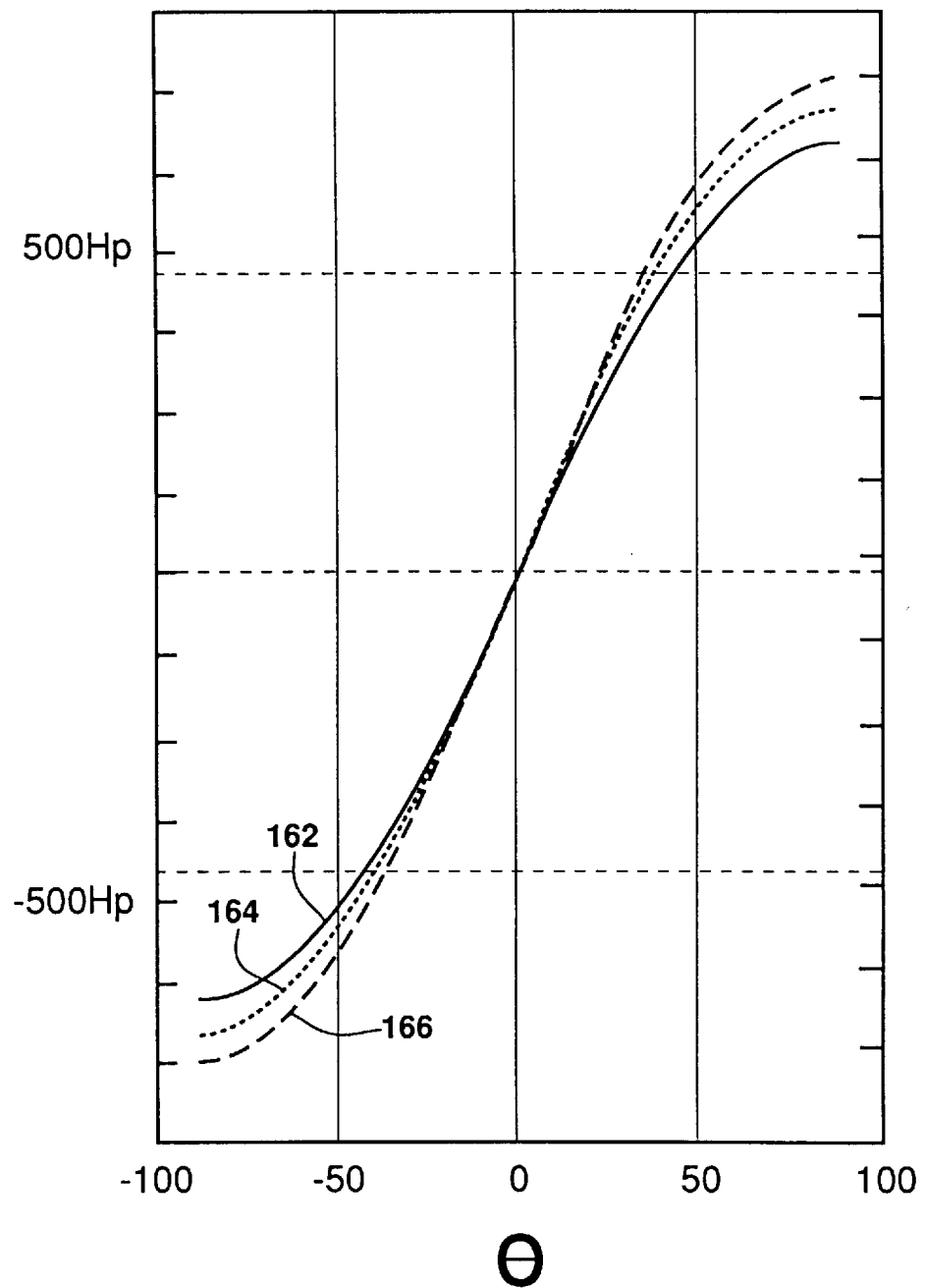
FIG. 9 is graphic representation of the root means squared of the power output as a function of excitation angle.

Referring to FIG. 9, a graphic representation of the power output is shown as a function of the excitation angle θ. It is shown in FIG. 9 that the output of power is substantially linear between −50° and 50°. Therefore, by varying the angle between the excitation voltage and the back EMF to produce the excitation angle θ, the output voltage may be easily manipulated to reach the desired output. The three lines 162,164,166 represent power outputs at 58,000 RPMs, 43,500 RPMs and 29,000 RPMs, respectively. In terms of horsepower, the range in which the power is substantially linear extends between a −500 horsepower and 500 horsepower. It should be noted that this discussion does not extend to regulating a bus at speeds below 29,000 RPM, although it can be done.

Figure 10:
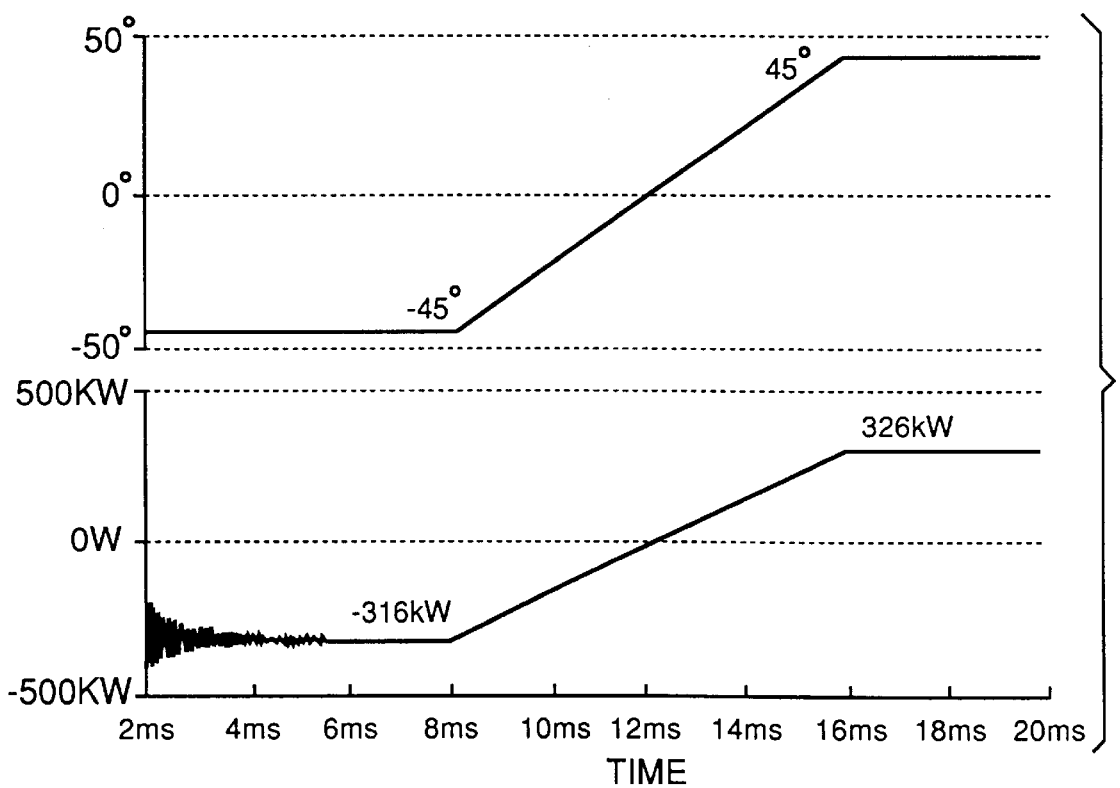
FIG. 10 is a graphic representation of the power output based on excitation angle control.

Referring to FIG. 10, it can be shown that, by changing the excitation angle θ from between a −45° and 45°, the power may be manipulated between a −316 kilowatts to approximately 326 kilowatt. Therefore, by controlling the excitation angle θ of the flywheel 102, the power output by the flywheel 102 may be accurately controlled.

The rotational speed of the flywheel 102 must be precise. In order to accurately determine the speed of the flywheel 102 to within one percent (1%), a counter is set at 200 in FIG. 11. A measurement of the position of the flywheel 102 is taken at 202. The counter is then incremented 204. The system then waits at 205 for the next set of sampled positions to arrive. A second measurement is then taken at 206. The change in position, delta position, is determined by subtracting the first position from the second position at 208. The time in between the two measurements, which is proportional to n, is measured at 210.

It is then determined whether the absolute value of the changed position exceeds a minimum number. In one embodiment, wherein there are 5,120 counts per revolution, the minimum value is 100 encoder counts. Therefore, if the delta position is greater than or equal to 100, at 212, the speed is calculated by dividing the delta by the time, at 216, and outputting the speed of the rotor at 218 whereafter it is determined whether the power is still on at 220. If so, then the counter is incremented at 204 and the speed estimation continues. If not, the speed estimation is terminated at 222. If the counter does not exceed 100, it is then determined whether the elapsed time exceeds one second, at 214. If the one second limit has elapsed, the speed is calculated 216. Otherwise, the counter is incremented at 204 and another measurement taken at 206. If the change in position is less than 100 and the time in which two measurements are taken does not exceed one second, then the counter 204 is incremented and new data is waited for at 205.

Figure 13:
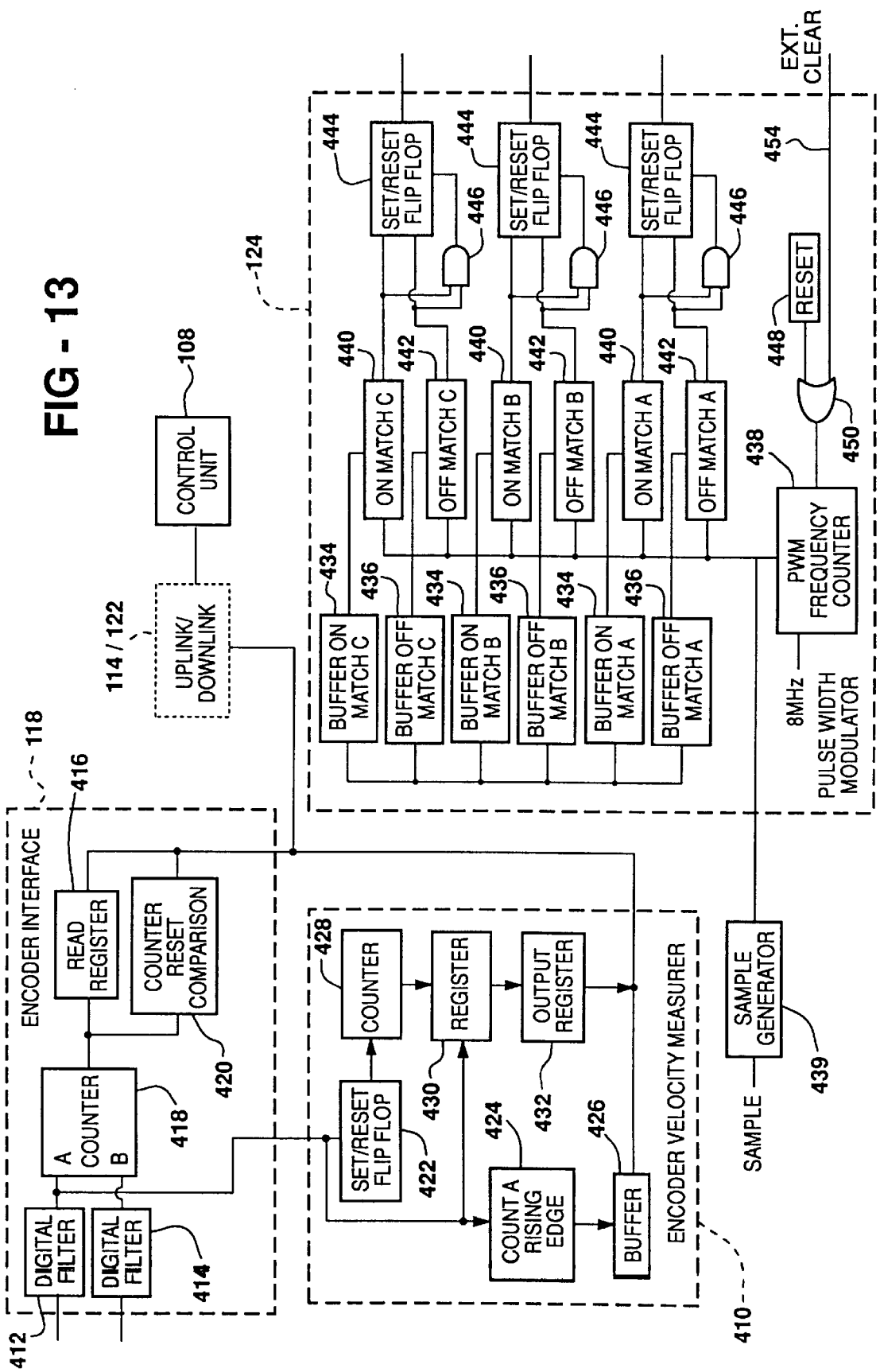
FIG. 13 is a block diagram schematic of the encoder and pulse width modulator of one embodiment of the present invention.

Referring to FIG. 13, the pulse width modulator 124 is connected directly to the encoder velocity measurer 410 which is, in turn, connected to the encoder interface 118 (also shown generally in FIG. 4). All modules are then interfaced to the processor via the processor interface 114/122. The encoder interface 118 includes two digital filters 412, 414. The digital filters 412,414 receive the inputs from the position sensing device 104 to determine the position of the flywheel 102. A reading register 416 receives the signals from a counter 418 which counts the number of rising edges received from the digital filters 412,414. The reading register 416 buffers the value from the counter so that it can be read freely by the control unit 108. The counter is copied to the reading register 416 when the sample generator 439 generates a sample. The sample generator 439 will be discussed subsequently. A counter comparator 420 compares the counts between the inputs received by the digital filters 412,414 and outputs a signal to reset the counter when the number of counts representing one revolution occurs. The digital filters 412,414 have a three bit buffer wherein a signal will not be sent on to the read register 416 and the counter comparator 420 until all three bits are of the same value.

Once the encoder velocity measurer 410 receives a rising edge of the A signal, it sets the SR flip flop 422. Again, a counter 424 counts the rising edges in the signal from the digital filter 412. This value is stored in a buffer 426. A counter 428 begins counting when the SR flip flop 422 is set. A register 430 stores values from the clear counter 428 whenever a rising edge of A occurs. The information is stored in the register 430 until required to be output, determined by a sample pulse from 439, where it is sent to an output register 432. Because the number of rising edges is counted based on an 8 MHz clock, the velocity of the flywheel can be determined by dividing the number of rising edges detected by the number of clock ticks the quotient of which is divided by the clock frequency, 8 MHz in this embodiment.

The pulse width modulator 116 receives commands from the control unit 108 through the uplink/downlink 114/122. Buffer ON match registers 434 and buffer OFF match registers 436 receive the information from the control unit 108. There are three buffer ON match registers 434 and three buffer OFF match registers 436, demarked by A,B,C. Each of these is used for each of the three phases of the voltages to the flywheel 102 which are offset by a 120°. The pulse width modulator 116 includes a pulse width modulator frequency counter 438 which is run by the 8 MHz clock. The pulse width modulator frequency counter 438 counts the number of counts in a switching cycle. In one embodiment, there are 512 pulse counts within a pulse period. Inputs from the buffer ON and OFF match registers 434,436 are input to ON match registers 440 and OFF match registers 442 upon a sample from the sample generator 439 to define the pulses within the pulse periods. The sample generator 439 generates a sample at a programmable count of the PWM frequency counter 438. Outputs from the ON match registers 440 and the OFF match registers 442 are immediately sent to three SR flip flops 444 which are controlled by the outputs of each of the ON match registers 440 and OFF match registers 442.

The ON and OFF match registers 440 and 442 generate pulses to the set/reset flip flops 444 when the pulse width modulator counter 438 value matches the match register value. It is this action that allows for a modulated pulse width. The AND gate 446 clears the SR flip flops 444 if the ON match and OFF match registers are set equal.

The pulse width modulator frequency counter 438 may be reset by a reset register 448 whose output is sent to the pulse width frequency counter 438 through an OR gate 450. Also, the pulse width modulator frequency counter 438 may be reset by an external clear line 454.

Figure 14:
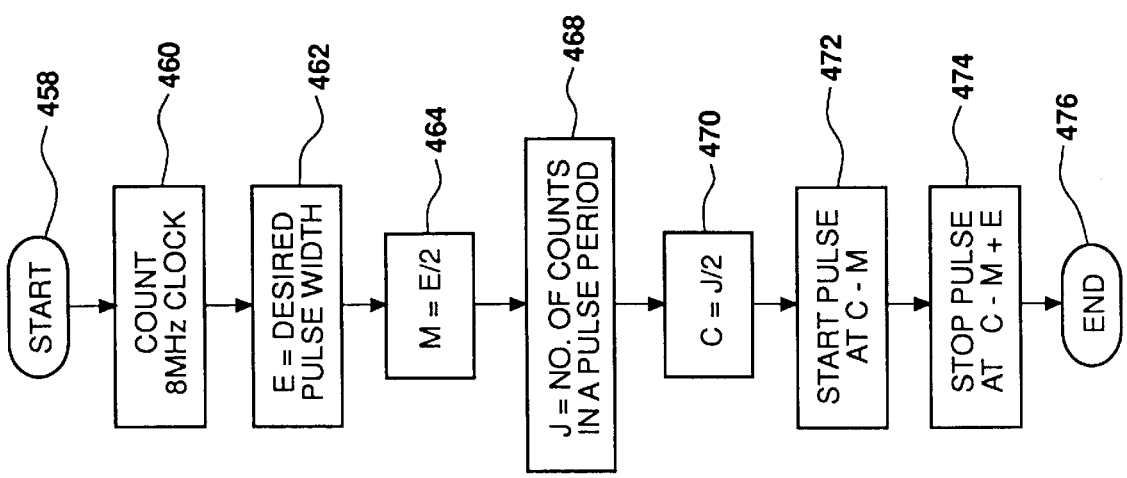
FIG. 14 is a flowchart of the operation of the pulse width modulator.

Referring to FIG. 14, the method for operating the pulse width modulator 116 to create center aligned pulses is shown. The total desired pulse width, in periods of 8 MHz, is defined by E at 462. A midpoint signal M is created by dividing E in half at 464. The number of counts in a pulse period is known from the setup of the reset register 448, and is used at 468 and assigned a variable J. The center of the pulse period C is defined by the number of counts in a pulse period divided by two at 470. By knowing the center point C of the pulse period and the midpoint M of the number of rising edges, the pulse width modulator 116 can accurately start creating a pulse at a pulse count defined by the center point C minus the midpoint signal M, at 472. The pulse width modulator 124 then terminates the pulse at a count defined as the center of the pulse period C minus M plus the desired signal E, at 474. This math is required due to integer processing, which truncates the fractions which could result from divisions of two. The method is then terminated at 476 for that pulse. By creating a pulse within the pulse period which is centered within the pulse period, the pulse width modulator 116 reduces the amount of ripple current received by the flywheel 102 by a factor of two.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A method for accurately estimating rotational speed of a rotor of a machine, the method comprising the steps of:

initializing a counter;

measuring a position of the rotor;

incrementing the counter;

waiting for a position update;

measuring a next position of the rotor;

calculating a difference between position measurements;

measuring the amount of time elapsed between the position measurements;

determining whether an absolute value of the difference exceeds a minimum value;

determining whether the amount of time exceeds a predetermined amount if the absolute value does not exceed the minimum value;

dividing the difference by the amount of time to amount;

determine the estimated rotational speed of the rotor; and outputting the estimated rotational speed of the rotor.

2. A method as set forth in claim 1 wherein the predetermined amount equals 100 encoder counts out of 5,120 encoder counts per revolution.

3. A method as set forth in claim 1 wherein the predetermined time equals 1 second.

* * * * *